June 19, 1956
E. W. GORTER
2,751,353
MAGNETIC MATERIAL
Filed April 11, 1950
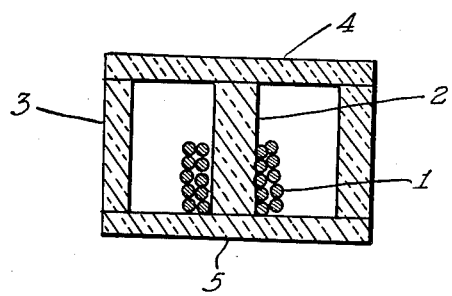
EVERT WILLEM GORTER
INVENTOR
BY
AGENT

United States Patent Office 2,751,353
Patented June 19, 1956

2,751,353
MAGNETIC MATERIAL

Evert Willem Gorter, Eindhoven, Netherlands, assignor to Hartford National Bank and Trust Company, Hartford, Conn., as trustee Application April 11, 1950, Serial No. 155,175
Claims priority, application Netherlands April 28, 1949
7 Claims. (Cl. 252—62.5)

The invention relates to a magnetic material suitable for employment in cores for electrical apparatus and more particularly to magnetic oxidic materials which are insulators and belong to the class of materials known as "ferrites."

The term "ferrite" as used hereinafter and as generally known in the art is an oxidic material having the general formula $MFe_2O_4$ where M is a bivalent metal, e. g. copper, magnesium, manganese, nickel, zinc, and/or others. These materials have been described in the literature (J. L. Snoek, Physica, 1936) and some of the ferrites have been found to be ferromagnetic while others are paramagnetic.

The ferrites generally have a cubic crystalline structure and belong to the class generally designated as spinels.

A ferrite departing from the terms of the general formula is also known in which the bivalent metal is replaced by a univalent metal. This ferrite is known as lithium ferrite, $Li_2O.5Fe_2O_3$ and has been described in "Naturwissenschaften" 26 (1938), on page 431. This ferrite is known to be ferromagnetic and to closely approximate the spinel structure insofar as its crystalline structure is concerned. Investigation of its physical properties has revealed that the material has a Curie point of 637° C. (cf. Hilpert, Hoffman and Huch Ber. 72.848, 1939) which value has not been confirmed by the applicant however. Measurements on a pure preparation of lithium ferrite indicated a Curie point of 680° C. which indicates that the compound described in the literature has impurities tending to lower the Curie point.

The "Curie point" of a magnetic material is that temperature at which a material loses its magnetic properties, i. e., the magnetic permeability of the material decreases sharply so that the material for all practical purposes is no longer ferromagnetic and becomes paramagnetic.

Lithium ferrite can be considered as a special case of the general ferrite formula in which the $M^{++}$ is replaced by $\frac{1}{2}M^{+}+\frac{1}{2}M^{+++}$ ($M^+$, $M^{++}$, and $M^{+++}$ designating univalent, bivalent, and trivalent metals respectively) in which case the formula for lithium ferrite can be rewritten as $Li_{\frac{1}{2}}Fe_{2\frac{1}{2}}O_4$ ($Li_2O.5Fe_2O_3$). For the purpose of clarity and consistency, this formula will be employed hereinafter in order to more fully explain the invention. However, to facilitate practicing the invention, the composition of the invention expressed in terms of the formula $Li_2O.5Fe_2O_3$ will also be furnished.

Lithium ferrite was found to have a comparatively high magnetic saturation value $\sigma$ ($\sigma$ being the magnetic saturation expressed in c. g. s. per gram at a specified temperature). For example, at 20° C. $\sigma=65$ and at −183° C., $\sigma=73$. The initial magnetic permeability of lithium ferrite at ambient temperatures, however, is quite low, i. e. between approximately 20 and 40 depending upon its method of preparation.

It is an object of the invention to provide a lithium ferrite having superior magnetic properties.

According to the invention, the initial magnetic permeability $\mu_0$ of lithium ferrite is increased by reacting this ferrite with zinc ferrite, $ZnFe_2O_4$ to form "mixed crystals" of lithium ferrite and zinc ferrite.

The term "mixed crystal" denotes a mutual solid solution of the two components above identified in which the individual components have merged their crystalline identities to form a single crystal structure. In other words, the compounds can be considered to have chemically combined to form a single crystalline phase.

The relative amounts of the two compounds should be such that the amount of zinc which is reacted with the lithium ferrite is less than that required for the formation of a product having a composition of 50 mol. percent $Li_{\frac{1}{2}}Fe_{2\frac{1}{2}}O_4$ ($Li_2O.5Fe_2O_3$) and 50 mol. percent $ZnFe_2O_4$.

These materials have higher values of initial magnetic permeability than the lithium ferrite and exhibit extremely low losses at very high frequencies of the order of 10 mc./sec. and higher. For example, mixed crystals of lithium-zinc ferrite constituted by 60 mol. percent $Li_{\frac{1}{2}}Fe_{2\frac{1}{2}}O_4$ ($Li_2O.5Fe_2O_3$) and 40 mol. percent $ZnFe_2O_4$ had an initial permeability $\mu_0$ of 107 at ambient temperatures and exhibited a loss factor tan $\delta$ ($R/\omega L$ as measured on annular solid core) of 0.06 at a frequency of 10.2 mc./sec.

In view of the comparative volatility of lithium oxide, the preparation of the material according to the invention should be effected with a view towards minimizing the sublimitation thereof. It is therefore advisable to start initially with a lithium compound which may be formed at a low temperature and in which the lithium oxide has a low vapor pressure, e. g. $LiFeO_2$ ($Li_2O.Fe_2O_3$). This compound can be produced by heating approximately equimolecular amounts of a lithium compound capable of reducing to lithium oxide by thermal decomposition, e. g. lithium carbonate, and ferric oxide in a finely divided state at a temperature of about 700° C. at which temperature a reaction takes place and $LiFeO_2$ ($Li_2O.Fe_2O_3$) is formed.

The latter compound is then mixed with zinc oxide and ferric oxide and the mixture sintered at a temperature preferably exceeding 1000° C. to cause a reaction to occur after which the mixed crystal of $Li_{\frac{1}{2}}Fe_{2\frac{1}{2}}O_4$ ($Li_2O.5Fe_2O_3$) and $ZnFe_2O_4$ are formed.

It may be preferable to provide a small excess of $LiFeO_2$ for the latter sintering operation in order to assure the required lithium content in the final product and to compensate for potential volatilisation of lithium oxide during sintering.

Alternatively, $\gamma$ −$Fe_2O_3$ can be reacted with a lithium compound capable of thermally decomposing to the oxide, e. g. lithium carbonate, at a temperature between about 400 and 500° C. and the product thus obtained sintered with zinc oxide and ferric oxide to form $Li_{\frac{1}{2}}Fe_{2\frac{1}{2}}O_4$ ($Li_2O.5Fe_2O_3$)

It is advisable to effect the sintering operation, irrespective of the particular method of preparation, in an "oxygen-controlling" atmosphere, i. e. an atmosphere having a partial pressure of oxygen such that at the sintering temperature and during a subsequent cooling operation, the material retains a sufficient amount of oxygen to satisfy the requirements of the formula $Li_{\frac{1}{2}}Fe_{2\frac{1}{2}}O_4(Li_2O.5Fe_2O_3)$.

The invention will be described in greater detail with reference to the following illustrative examples and the accompanying drawing showing one form of core construction employing the material according to the invention.

*Example 1*

74 gms. of (1 mol.) lithium carbonate is ground for three hours in an iron mill together with 160 gms. of (1 mol.) ferric-oxide under benzene. The benzene is then removed and the mixture of lithium carbonate and ferric-oxide is heated for 5 hours at 700° C., the compound $LiFeO_2$ thus produced serving as a raw material for the preparation of the mixed crystals of $Li_{\frac{1}{2}}Fe_{2\frac{1}{2}}O_4(Li_2O.5Fe_2O_3)$ and $ZnFe_2O_4$.

In order to produce $Li_{\frac{1}{2}}Fe_{2\frac{1}{2}}O_4(Li_2O.5Fe_2O_3)$ a mixture of $LiFeO_2(Li_2O.Fe_2O_3)$ and $Fe_2O_3$ in a molecular ratio of 1:2 is ground under benzene; the benzene is removed and the mixture of the two solid substances is heated for 4 hours at 700° C. in air. 33.7 gms. of the $Li_\frac{1}{2}Fe_{2\frac{1}{2}}O_4(Li_2O.5Fe_2O_3)$ thus obtained is ground for three hours under alcohol with 7.15 g. of zinc oxide and 14.8 g. of ferric-oxide; the alcohol is removed and the mixture of the solid substances is heated for 5½ hours in air at a temperature of from 700° to 720° C. After cooling the reaction product, which has approximately a composition of 65 mol. percent $$Li_\frac{1}{2}Fe_{2\frac{1}{2}}O_4(Li_2O.5Fe_2O_3)$$

and 35 mol. percent $ZnFe_2O_4$ (31.7 mol percent $$Li_2O.5Fe_2O_3$$

and 68.3 mol percent $ZnFe_2O_4$), is moulded to form a small ring, which is then heated for 5 hours in oxygen at a temperature of 1100° C. and is then slowly cooled. Mixed crystals of $Li_\frac{1}{2}Fe_{2\frac{1}{2}}O_4(Li_2O.5Fe_2O_3)$ and $ZnFe_2O_4$ are obtained which have an initial permeability $\mu_0$ of 92. The quotient $$\frac{\tan \delta}{\mu_0}$$

of the loss factor tan δ (defined as above) and the initial permeability $\mu_0$, both measured at a frequency of 1 mc./sec., is approximately $0.5 \times 10^{-4}$, while $f_6$ i. e. the frequency at which tan δ attains the value 0.06, is 13.5 mc./sec.

*Example II*

$LiFeO_2(Li_2O.Fe_2O_3)$ is produced by grounding together lithium-carbonate and ferric oxide under benzene and, subsequent to the removal of benzene, by heating in air at 700° C. for 5 hours. A mixture of $$LiFeO_2(Li_2O.Fe_2O_3)$$

zinc oxide and ferric oxide in a molecular ratio of approximately 9:22:40 is then ground and sintered to produce mixed crystals of $Li_\frac{1}{2}Fe_{2\frac{1}{2}}O_4(Li_2O.5Fe_2O_3)$ and $ZnFe_2O_4$ with a ratio of 55 mol. percent zinc ferrite and 45 mol. percent $Li_\frac{1}{2}Fe_{2\frac{1}{2}}O_4(Li_2O.5Fe_2O_3)$ (82.7 mol percent zinc ferrite and 17.3 mol percent $Li_2O.5Fe_2O_3$). The mixture is then preheated in air at 800° C. for two hours and, subsequent to cooling, ground under alcohol. After removal of the alcohol, a ring is moulded under a pressure of 1.5 ton per cm.²; it is sintered in oxygen at 1200° C. for two hours and then slowly cooled. A material is thereby obtained which is relatively non-porous and has an initial permeability $\mu_0$ of 307 and a value for the quotient $$\frac{\tan \delta}{\mu_0}$$

(cf. Example I), measured at a frequency of 1 mc./sec., is approximately $10^{-4}$, while $f_6=1.5$ mc./sec.

*Example III*

A mixture of lithium-carbonate, zinc oxide and ferric oxide in a molecular ratio of 3:4:19 (a slight excess of a lithium-carbonate being provided) is ground under benzene, in order to obtain after final sintering, mixed crystals having a composition of 25 mol. percent zinc ferrite and 75 mol. percent $Li_\frac{1}{2}Fe_{2\frac{1}{2}}O_4(Li_2O.5Fe_2O_3)$ (57 mol percent zinc ferrite and 43 mol percent $$Li_2O.5Fe_2O_3)$$

After removal of the benzene, the mixture is heated in air at 700° C. for 5.5 hours; a ring is then molded under a pressure of 1.5 ton per cm.² and is sintered at 1100° C. in oxygen for 4 hours and then slowly cooled in oxygen. The material thus obtained has an initial permeability $\mu_0$ of 62 and a value for the quotient $$\frac{\tan \delta}{\mu_0}$$

(cf. Example I), measured at a frequency of a mc./sec., of $1.10.10^{-4}$, while $f_6=20.5$ mc./sec.

The material described is a ferrite material, which is particularly suitable for use at very high frequencies, i. e. frequencies exceeding 1 mc./sec. Since the loss factor tan δ tends to increase comparatively rapidly with increasing frequency but not, however, until above frequencies exceeding 1 mc./sec. and often at frequencies greatly exceeding 1 mc./sec. this property is conducive to the employment of this material at relatively high frequencies. Obviously, the material is also suitable for use at frequencies lower than 1 mc./sec., e. g. as magnet cores in Pupin-coils or loading coils and filter coils. It can also be used for various other uses requiring low electromagnetic losses and as a magnetic screening material.

The figure of the drawing shows one form of a coil embodying a core constituted by mixed crystals of $$Li_\frac{1}{2}Fe_{2\frac{1}{2}}O_4(Li_2O.5Fe_2O_3)$$

and $ZnFe_2O_4$. The coil 1 is wound on the central post 2 of a shielded coil assembly. The peripheral wall 3 of the core is constituted by the same material as well as the bridge pieces 4 and 5.

While I have thus described my invention with specific examples and applications, other obvious modifications thereof will be readily apparent to those skilled in the art without departing from the spirit and scope of the invention as defined in the appended claims.

What I claim is:

1. A ferromagnetic material consisting of mixed crystals having a spinel structure constituted by about 17.3 to 43 mol. per cent of $Li_2O.5Fe_2O_3$ and about 57 to 82.7 mol. per cent of $ZnFe_2O_4$.

2. A ferromagnetic material consisting of mixed crystals having a spinel structure constituted by about 31.7 mol. per cent of $Li_2O.5Fe_2O_3$ and about 68.3 mol. per cent of $ZnFe_2O_4$.

3. A ferromagnetic material consisting of mixed crystals having a spinel structure constituted by about 17.3 mol. per cent of $Li_2O.5Fe_2O_3$ and about 82.7 mol. per cent of $ZnFe_2O_4$.

4. A ferromagnetic material consisting of mixed crystals having a spinel structure constituted by about 43 mol. per cent of $Li_2O.5Fe_2O_3$ and about 57 mol. per cent of $ZnFe_2O_4$.

5. A method of manufacturing a ferromagnetic material comprising the steps of mixing $Li_2O.Fe_2O_3$, $ZnO$, and $Fe_2O_3$ in amounts producing upon subsequent heating mixed crystals constituted by about 17.3 to 43 mol. per cent $Li_2O.5Fe_2O_3$ and 57 to 82.7 mol. per cent, $ZnFe_2O_4$, and heating the mixture to a temperature of about 1000° to 1200° C. to form the mixed crystals.

6. A method of manufacturing a ferromagnetic material comprising the steps of mixing $Li_2O.Fe_2O_3$, $ZnO$, and $Fe_2O_3$ in amounts producing upon subsequent heating mixed crystals constituted by about 17.3 to 43 mol. per cent $Li_2O.5Fe_2O_3$ and 57 to 82.7 mol. per cent $ZnFe_2O_4$, preheating the mixture to a temperature of about 700 to 800° C., grinding the preheated product, and sintering the preheated product at a temperature of about 1000 to 1200° C. to form the mixed crystals.

7. A composition having a spinel structure consisting essentially of a solid solution of about 17–43 mol. per cent $Li_2O.5Fe_2O_3$ and about 83–57 mol. per cent $ZnFe_2O_4$.

References Cited in the file of this patent

UNITED STATES PATENTS

| | | |
|---|---|---|
| 2,452,529 | Snoek | Oct. 26, 1948 |
| 2,452,530 | Snoek | Oct. 26, 1948 |
| 2,549,089 | Hegyi | Apr. 17, 1951 |

OTHER REFERENCES

Naturwissenschaften 26 (1938), page 431.